United States Patent

Haag et al.

[11] 4,120,674
[45] Oct. 17, 1978

[54] FILTERING ARRANGEMENT FOR VACUUM LOADERS

[75] Inventors: Franz Haag, Isny, Allgaü; Paul Bongartz, Isny-Kleinhaslach, both of Fed. Rep. of Germany

[73] Assignee: Motan Gesellschaft mit beschrankter Haftung, Isny, Allgau, Fed. Rep. of Germany

[21] Appl. No.: 805,000

[22] Filed: Jun. 9, 1977

[30] Foreign Application Priority Data
Jun. 9, 1976 [DE] Fed. Rep. of Germany ....... 2625734

[51] Int. Cl.² .............................................. B01D 46/04
[52] U.S. Cl. ....................................... 55/302; 55/432
[58] Field of Search ................ 55/283, 218, 302, 96, 55/97, 337, 432

[56] References Cited

U.S. PATENT DOCUMENTS

| 3,240,000 | 3/1966 | Hayes et al. | 55/337 |
| 3,385,033 | 5/1968 | Basore et al. | 55/302 |
| 3,407,570 | 10/1968 | Steinmetz | 55/283 |
| 3,951,623 | 4/1976 | Furstenburg | 55/96 |

Primary Examiner—Bernard Nozick
Attorney, Agent, or Firm—Walter Becker

[57] ABSTRACT

A filtering arrangement for vacuum loaders, particularly for conveying pulverous materials. The upper part of a filtering container is provided with a cylindrical conveying filter for conveying air withdrawn from the filtering container radially through the conveying filter. A scavenging air filter, for the scavenging air flowing out of the filtering container during the cleaning operation, is arranged above the conveying filter and forms a scavenging air chamber with the inner wall of the filtering container, air flowing axially through the scavenging air chamber.

7 Claims, 5 Drawing Figures

Fig. 3
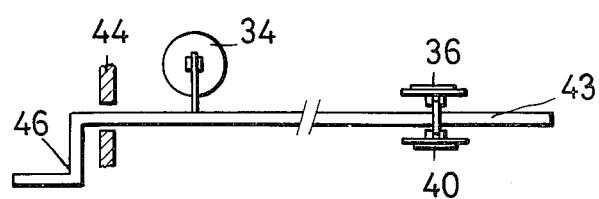
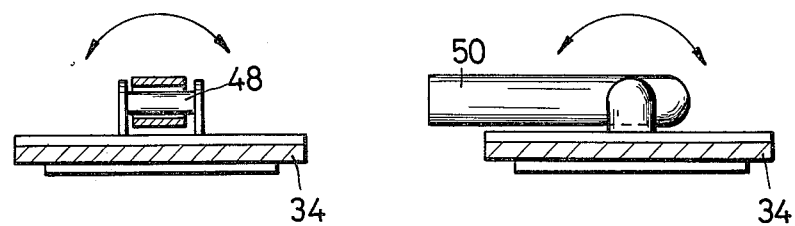
Fig. 4    Fig. 5

FILTERING ARRANGEMENT FOR VACUUM LOADERS

The present invention relates to a filtering arrangement for vacuum loaders, particularly for conveying pulverous materials, according to which the upper part of a filtering container is provided with a cylindrical conveying filter for conveying air withdrawn from the filtering container radially through said filter.

German Auslegeschrift No. 2,304,336 discloses a filtering arrangement for vacuum loaders, according to which a conveying filter divides the filtering container into two chambers. The conveying filter is in this case not cleaned according to the countercurrent principle, that is, with a reverse air flow, but rather by knocking material off of the filter.

Therefore, this known filtering arrangement is only suitable for use with granular material and not pulverous material.

It is an object of the present invention to provide a filtering arrangement of the above mentioned general type which, without materially increasing its overall height, is also suitable for pulverous material.

This object and other objects and advantages of the present invention will appear more clearly from the following specification in connection with the accompanying drawings, in which:

FIG. 3 is a top view of an automatic control for the valves of another embodiment of the invention; and FIGS. 4 and 5 are a cross section and side view respectively of a Cardanic suspension of the valves of FIG. 3.

Figure 1:
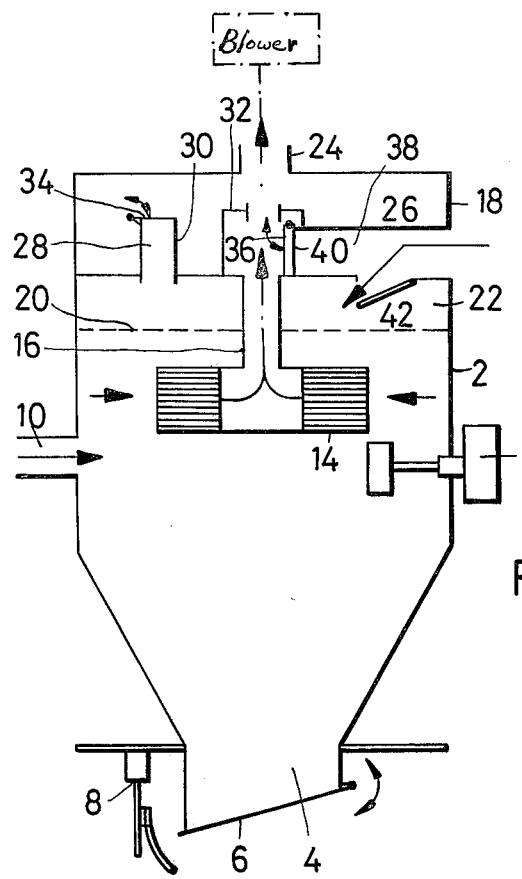
FIG. 1 shows diagrammatically one form of a filtering arrangement according to the invention during a conveying operation.

The filtering arrangement pursuant to the present invention is characterized primarily in that a flushing or scavenging air filter, for the scavenging air flowing out of the filtering container during the cleaning operation, is arranged above the conveying filter and forms a scavenging air chamber with the inner wall of the filtering container, the air flowing axially through the scavenging chamber. With the filtering arrangement according to the present invention, the conveying filter may be cleaned with scavenging air flowing counter to the direction of withdrawal. This filtering arrangement is suitable for pulverous material having granular sizes down to μ's and has a filter arrangement the geometry of which, in regard to its effectiveness and overall height, is particularly favorable. The low overall height of the filtering arrangement according to the present invention is due to the fact that a flat scavenging filter is used. With such a filter, in consequence of the arrangement thereof above the conveying filter, not all particles blown away from the conveying filter during the cleaning operation need be taken up by the scavenging air filter, since a large proportion of these particles falls down and thereby can be withdrawn without difficulty with a reversed arrangement.

Due to the relatively low density of the particles in the air during the cleaning operation, the filter may be expediently dimensioned in such a way that the filter resistance of the conveying filter is considerably less than that of the scavenging air filter and the filter surface of the conveying filter is considerably greater than that of the scavenging air filter.

An automatic cleaning effect is achieved for the scavenging air filter if the scavenging air filter is in the form of a diaphragm and is arranged for air flow vertically therethrough.

The cleaning of the conveying filter can take place also during the suction operation if a first valve is provided in the lid of the filtering container. This first valve connects the inner space of the conveying filter with the suction side of a conveyor blower. A second valve is also provided which connects the inner space of the conveying filter to the outside air during the cleaning operation. A third valve is provided which connects the scavenging air chamber during the cleaning operation to the suction side of the conveyor blower. Therefore, the cleaning may take place at the same time as the material is discharged from the filtering container and during feeding of such further processing machines, such as extruders, which have supply containers which, in view of their constant shape, must remain pressureless.

With particularly critical types of powder, a further construction of the filtering arrangement according to the present invention is recommended, according to which, in the lid of the filtering container, a fourth valve is provided with the aid of which the scavenging air chamber for the cleaning of the scavenging air filter may be connected to the outside air.

Under particularly difficult conveying conditions, a separate control of the aforesaid valves may be provided. With the use of an electronic circuit for the control of the valves, different exchangeable shift units may be provided with which the control times of each valve can be determined independently of one another, so that an adaptation to different conditions is possible.

If the conveying conditions however do not vary substantially, it is sufficient if the valves are automatically controlled. This may be effected mechanically by a cam arrangement. A particularly simple automatic control is obtained if the first, second and third valves are flap valves, the valve flaps of which are fastened to a common control shaft which is rotatable from the outside. For better adaptation of the flap valves to the valve seats, the valve flaps may have Cardanic suspensions.

Figure 2:
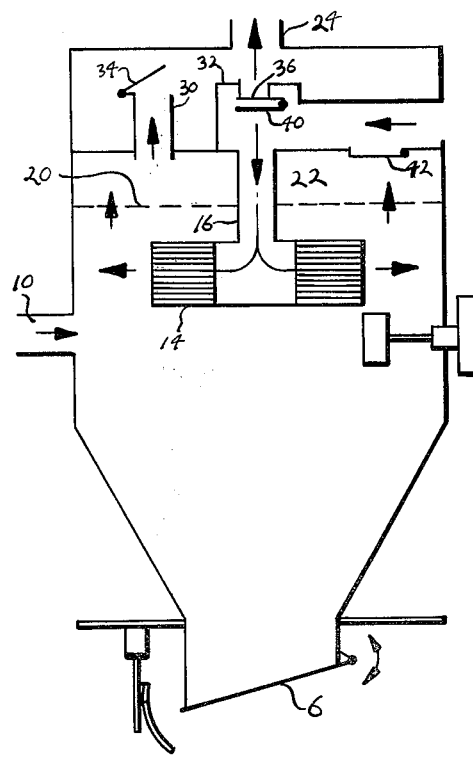
FIG. 2 shows the filtering arrangement of FIG. 1 while cleaning the conveying filter.

Referring now to the drawings in detail, FIGS. 1 and 2 show a filtering container 2 having at the bottom end thereof an outlet opening 4 for the material to be conveyed. During a conveying operation of the vacuum loader, the opening 4 is closed by a flap valve 6. Below the outlet opening 4 is arranged a level sensing switch 8 for monitoring the filling level of the material. Above the outlet opening 4, a conveyor pipe 10 leads into the filtering container 2. On that side of the filtering container 2 which is opposite the conveyor pipe 10 is mounted a further level indicator 12.

A cylindrical conveying filter 14 is in vertical position mounted at the level of or above the mouth of the conveyir pipe 10 on a tubular connection piece 16 which is coaxial with the filter 14 and leads into a cover 18 of the filtering container 2. The conveying filter 14 preferably comprises an exchangeable filter cartridge with a star-shaped filter insert and is arranged for through-flow in the radial direction only.

Between the conveying filter 14 and the underside of the cover or lid 18 is located a scavenging air filter 20. The scavenging air filter 20 is in the form of a diaphragm and extends horizontally, so that flow is axially therethrough, in contrast to the conveying filter 14. The filter 20 has, in addition, a substantially larger filter resistance and a substantially smaller surface than does the conveying filter 14. Finally, the scavenging air filter 20, the cover 18, and the side walls of the filtering container 2 form a scavenging air chamber 22.

The cover 18 of the filtering container 2 has a hollow chamber 26 into which feed a suction pipe 24, which originates from a conveying blower, and the tubular connection piece 16. Furthermore, in the cover 18 is provided an opening 28 communicating with the scavenging air chamber 22. Above this opening 28 and above the mouth of the connection piece 16 which originates at the conveying filter 14, there are arranged in the hollow space 26 of the cover 18 tubular connection pieces 30 and 32 of equal length having openings on top which form valve seats and are closable by the valve flaps 34, 36. From the connection piece 32 in the cover 18, directly above the conveying filter 14, a venting pipe 38 leads laterally outwardly, said pipe 38 forming a valve seat at that end thereof which is adjacent the tubular connection piece 32. The pipe 38 is closable with the aid of a flap valve 40. The valve flaps 36 and 40 may, as shown in FIGS. 1 and 2, be controlled simultaneously by a common shaft, in which connection one flap opens when the other closes.

In a preferred embodiment of the present invention, the scavenging air chamber 22 is additionally connected to the venting pipe 38 by an opening closable with the aid of a flap valve 42.

A particularly simple automatic control of the valves 34, 36 and 40 is shown in FIG. 3, according to which the valves must lie in one plane, as is the case in the preceding embodiment. The valve flaps are fastened to a common control shaft 43, which may extend outwardly through a stuffing box 44 at a corresponding place in the cover 18 of the filtering container 2 and terminate in a crank 46. Rotation of the crank 46, and thereby control of the valves 34, 36 and 40, may be effected, for example, by an electromagnetic or pneumatic cylinder (not shown). The valves on the control shaft 43 are arranged in such a way that the valves 34 and 40 close when the valve 36 opens, and vice versa.

The valve flaps, for compensation of the manufacturing tolerances, are expediently provided with Cardanic suspensions, as shown in FIGS. 4 and 5 for the valve flap 34. With this arrangement, at the connecting place between an arm 50 of the control shaft 43 and the valve flap 34, an anti-friction bearing 48 extending parallel to the control shaft 43 is provided. The valve flap can be moved in the plane of rotation of the anti-friction bearing only by a few degrees because the arm so extends beyond the bearing and thus forms a stop. In the plane perpendicular to this plane of rotation, the valve flap may, due to a corresponding play in the bearing, likewise be moved by a few degrees. With this suspension, on the one hand the valve flap for the valve seat is fixed sufficiently accurately, and on the other hand it has, however, sufficient play to compensate for manufacturing tolerances.

The mode of operation of the embodiment shown in FIGS. 1 and 2 is as follows:

In FIG. 1 the filtering arrangement is shown during a conveying operation. The arrows indicate the direction of flow of air. In the convexing operation the valve 36 is open, so that air is drawn from the filtering container 2 by the conveyor blower through the suction pipe 24, the hollow space 26, the connection pieces 32 and 16, and the conveying filter 14. The air flows radially from the outside inwardly into the conveying filter 14. Since all remaining valves as well as the flap 6 intended for the emptying of the filtering arrangement are closed, a partial vacuum is formed in the filtering container so that, through the conveyor pipe 10, material to be conveyed is drawn into the filtering container, where it is filtered. The amount conveyed into the container is regulated by a time switch (not shown) or by a level indicator 12.

The conveying procedure is interrupted by closing the valve 36. Emptying of the filtering container 2 is initiated by opening the flap 6. At the same time the valves 34 and 40 are opened, so that outside air is admitted through the pipe 38, the pipe connection pieces 32 and 16, and the conveying filter 14 into the inside of the container, from where, axial to the conveying filter 14, the air is guided away through the scavenging air filter 20 by means of the valve 34 and the suction pipe 24. By means of the air now flowing from the inside outwardly in the opposite direction through the conveying filter 14, the conveying filter 14 is cleaned of material to be conveyed which had adhered to said filter. Particles blown away from the conveying filter 14 during the cleaning operation for the most part drop down into the funnel-shaped bottom end of the container. Only a small portion of the particles blown away, if extremely fine powder is being conveyed, is carried upwardly with the axial air current and is filtered at the scavenging air filter 20. After the cleaning operation and the emptying of the filtering container, the conveying operation can again take place.

The conveyor blower may, in the embodiment shown, be operated either continuously or intermittently if the cleaning operation is, for example, to be of shorter duration than the emptying time.

With the diaphragm construction of the scavenging air filter, a special cleaning of the filter is generally unnecessary for a long time. By means of oscillations of the diaphragm, a certain amount of self-cleaning takes place.

If, however, separate cleaning of the scavenging air filter is necessary after short time intervals, the embodiment shown in FIGS. 1 and 2 does not present any difficulties, since the scavenging air filter, like the conveying filter, can be cleaned by a reverse air flow without having to be removed. For this purpose the valves 34 and 40 are closed, while the valve 42, which is between the venting pipe 38 and the scavenging air chamber 22, and the valve 36 are opened, so that air flows from the outside into the scavenging air chamber and, in contrast to the direction of flow during the cleaning operation of the conveying filter, flows through the scavenging air filter in the opposite direction.

It is, of course, to be understood that the present invention is by no means limited to the specific showing in the drawings, but also encompasses any modifications within the scope of the appended claims.

What we claim is:

1. A filtering arrangement for vacuum loaders, for filtering, conveying and cleaning operations, particularly for pulverous materials, which comprises in combination:

a filtering container having an inner wall;
a cylindrical conveying filter arranged within said filtering container having inlets and outlets arranged in such a way as to convey air to be withdrawn from said filtering container radially through said conveying filter;

a scavenging air filter arranged within said filtering container and above said conveying filter, said scavenging air filter forming a scavenging air chamber with a portion of said inner wall of said filtering container, said scavenging air filter being in the form of a diaphragm and being arranged for passing air vertically therethrough, a blower means connected in communication with the scavenging air chamber and operable selectively; and cover means associated with said filtering container and having opening means connectable to said blower means, said cover means including:

first valve means for connecting the interior of said conveying filter selectively with the suction side of said blower means, second valve means for connecting the interior of said conveying filter selectively with outside air during the cleaning operation in a flow direction radially of said conveying filter, and third valve means for connecting said scavenging air chamber selectively with the suction of said blower means during the cleaning operation of said conveying filter in opposite counter flow radial direction from inside to outside due to selective instant reversal of flow direction effected by said first and second valve means selectively therewith.

2. A filtering arrangement in combination according to claim 1, in which the filter resistance of said conveying filter is considerably less than the filter resistance of said scavenging air filter, and in which the filter surface of said conveying filter is considerably greater than the filter surface of said scavenging air filter.

3. A filtering arrangement in combination according to claim 1, in which said cover means further includes fourth valve means for connecting said scavenging air chamber with outside air during the cleaning operation of said scavenging air filter.

4. A filtering arrangement in combination according to claim 3, in which control means for all four valve means are controllable independent of one another.

5. A filtering arrangement in combination according to claim 3, in which said first, second and third valve means are flap valves, and which includes rotatable control shaft means associated with said filtering container and operable from the outside thereof, the flaps of all of said flap valve means being fastened to said control shaft means.

6. A filtering arrangement in combination according to claim 5, in which said fourth valve means is also a flap valve.

7. A filtering arrangement in combination according to claim 6, in which the flaps of at least said first, second and third flap valves are Kardanically suspended.

* * * * *